June 27, 1933.                A. WIRTH                1,915,708
             COMBINED DRILLING AND MILLING MACHINE
                   Filed Jan. 14, 1932      2 Sheets-Sheet 1

A. Wirth
   INVENTOR
By: Marks & Clark
         Attys

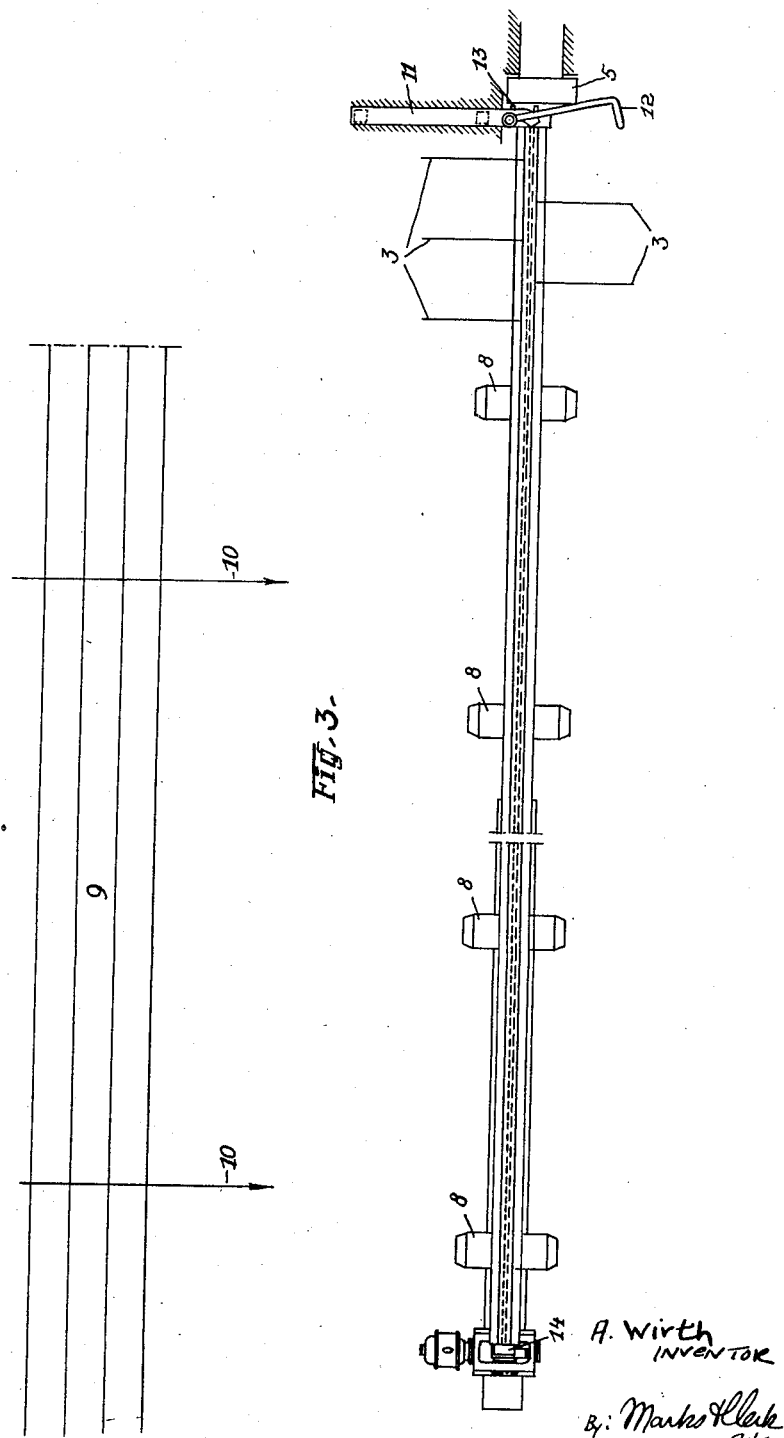

Patented June 27, 1933

1,915,708

UNITED STATES PATENT OFFICE

ALFRED WIRTH, OF ERKELENZ, GERMANY

COMBINED DRILLING AND MILLING MACHINE

Application filed January 14, 1932, Serial No. 586,627, and in Germany January 23, 1931.

Combined rail drilling and milling machines are known, which however have the disadvantage that a clear view of the work is obstructed. The view is mainly obstructed by the clamping bow which secures the rail simultaneously at two points. Furthermore, in order that the clamping bow shall be capable of withstanding the high clamping pressures, it is connected by heavy struts both to the milling machine and to the drilling machine, which of course still more obstructs the view. More particularly, in these known machines it is very difficult to observe the rail as it is being brought into position and the operation of the drill spindle head stocks. A further disadvantage is that, in the case of a breakdown or the like, the machine can be taken apart only with difficulty, which is of importance for the reason that in iron works only untrained hands are frequently available for attending to the machine. Thus, for instance, the removal of the drilling spindle head stocks is dependent on the construction of the clamping bow and in the known machines the latter very seriously hinders their removal.

The combined drilling and milling machine according to the invention overcomes these disadvantages. It can be made easily and at low cost and so as to be easy to manipulate and not obstruct the view of the work. An essential feature of the invention is that in place of the clamping bow with two clamping plungers only a single clamping plunger is provided. This clamping plunger is preferably operated independently, either electrically, mechanically, pneumatically or hydraulically. Through the provision of a single clamping plunger the construction is very considerably simplified, so that the drilling spindle head stocks and other parts can be easily exchanged and more particularly that a far better view of the insertion and clamping of the rail to be operated on can be obtained. For further facilitating the minding of the machine and ensuring a reliable operation of the machine the drilling machine and the milling machine are driven separately. The simplicity of the construction also makes the provision of a gauge carriage which determines the position of the rail to be operated on with respect to the operative tools in such a manner as to make it unnecesary previously to mark out the rail to the correct length.

Figure 1:
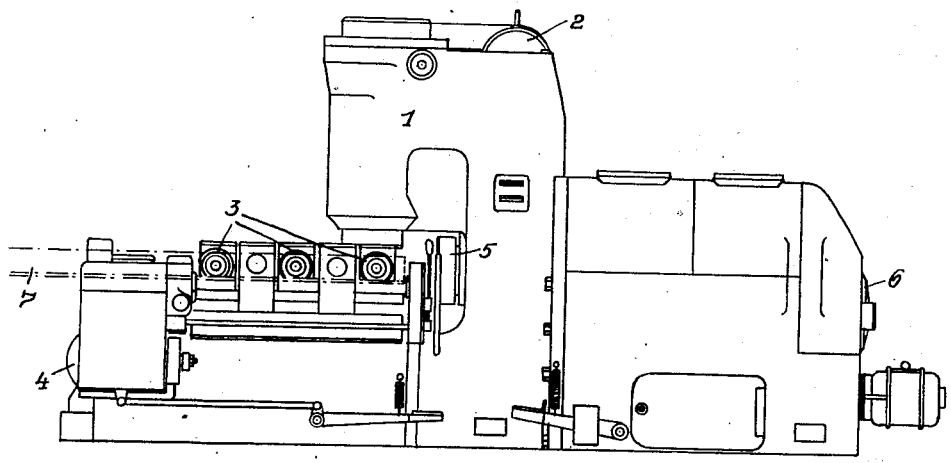
Figure 2:
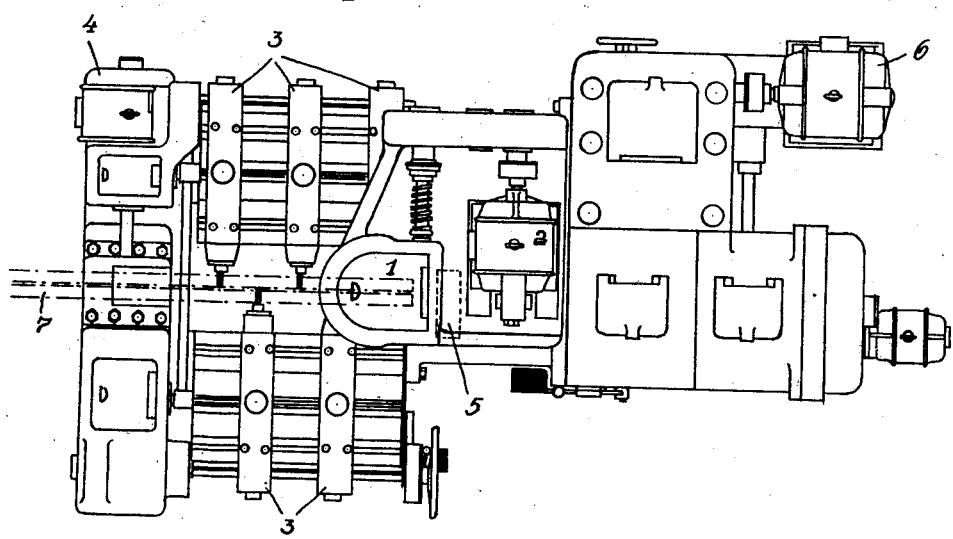

Further features of the invention will be gathered from the following description of a constructional example illustrated in the accompanying drawings, in which Fig. 1 is a side elevation of the machine according to the invention, Fig. 2 a plan view of the machine and Fig. 3 a diagrammatic view showing the means for bringing the rails up to the machine and adjusting them.

In Figs. 1 and 2 of the drawings 1 is the single clamping plunger which is operated by the motor 2, suitably by means of a press button control, an alarm coupling arrangement being preferably provided as a safety means against an excessive clamping pressure.

As will be seen from the figure, the clamping plunger with the means for operating it occupy only a small amount of space, so that the drill spindle head stocks 3 are readily accessible and can be easily observed. The electromotive driving means 4 for the drill spindle head stocks is disposed laterally. For driving the milling head 5 driving means 6 are provided, which are disposed on the other side of the whole machine.

The rail 7 occupies with respect to the machine the position shown in Fig. 2 in broken lines.

For bringing the rail without previous marking out into its exact position with respect to the tools, a special adjusting arrangement is provided, as shown in Fig. 3. In this figure the drill spindles 3 are indicated purely diagrammatically. They are only intended to give an idea of how the machine is arranged with respect to the feeding and adjusting means. The feeding means is a roller bed 8. To it the rails are fed from the stack of rails 9 by drawing means in the direction of the arrow 10. In proximity to the milling head 5 is a gauge carriage 11 which is adapted to be displaced on rollers out of range of the milling head. With this carriage a lever 12 is combined for displacing the rails. A cam surface or arcuate seat 13 on the gauge carriage serve for receiving the milling head on being removed from the machine, when the milling cutter is to be reground. The lever 12 is pivoted to the carriage 11 by a bolt 7' and fixed to the bolt is a block 8' normally engaged in the recess 9' of the carriage. Upon swinging the lever 12 in one direction the block will engage the adjacent end of the rail 7 and displace the same in the direction of the stop 14. When it is desired to remove the milling cutter head 5, the carriage 11 is fed so that the surface or seat 13 is under the cutter head, whereupon the screw of the cutter head is removed and the cutter rests in the seat. The carriage is then fed further so that the cutter can be conveniently removed for regrinding. The rails as already stated are fed by the hauling devices to the roller bed which is provided with driving means. The stop in the machine is situated in front of the milling head and the rail runs against the said stop. At the same moment an adjustable stop 14 in the roller bed adjusts itself and forms a rigid abutment. The attendant thereupon forces the rail against the stop in the roller bed by means of the displacing lever 12. The stop in the roller bed can be operated by hand or electrically, hydraulically or pneumatically by a distant control from the attendant's platform.

What I claim is:

1. A machine for drilling and milling rails, comprising in combination a machine frame, a milling cutter head on said frame for milling the ends of the rails, a plurality of drilling mechanisms associated with said frame on one side of said milling head, a clamping plunger support on the machine frame on the other side of the milling head, said clamping plunger support having a portion overhanging the milling cutter head and a single clamping plunger on the overhanging portion of the clamping plunger support for holding the rails in position during the milling and drilling operations on the rail, said clamping plunger head arranged to engage the rails on the same side of the milling cutter head as the drilling mechanisms.

2. A machine for drilling and milling rails, comprising in combination a machine frame, a milling cutter head on said frame for milling the ends of the rails, a plurality of drilling mechanisms associated with said frame arranged to act on the rail from opposite sides of the rail and located on one side of the milling cutter head, a clamping plunger support on the machine frame on the other side of the milling cutter head, said clamping plunger support having a portion overhanging the milling cutter head, and a single clamping plunger on the overhanging portion of the clamping plunger support arranged to engage the rails between the milling head and drilling mechanisms for holding the rails in position during the milling and drilling operations.

3. A machine for drilling and milling rails comprising a frame, a clamping plunger support on the frame, a milling cutter head on the frame, a bed for feeding the rails to the head, a gauge carriage carried by the plunger support and movable between the rail and head, said carriage having means associated therewith for receiving and supporting the cutter head when disengaged from the machine.

In testimony whereof I have signed my name to this specification.

ALFRED WIRTH.